United States Patent

[11] 3,603,772

[72] Inventors T. O. Paine
Administrator of the National Aeronautics and Space Administration with respect to an invention of;
Willis W. Allen

[21] Appl. No. 856,282
[22] Filed Sept. 9, 1969
[45] Patented Sept. 7, 1971

[54] ANALOG-TO-DIGITAL CONVERTER ANALYZING SYSTEM
17 Claims, 6 Drawing Figs.

[52] U.S. Cl. .......... 235/153, 324/73 AT, 340/347 AD
[51] Int. Cl. .......... H03k 13/32
[50] Field of Search .......... 340/146.1, 347; 235/153; 324/73 AT

[56] References Cited

UNITED STATES PATENTS

| | | | |
|---|---|---|---|
| 2,920,818 | 1/1960 | Taylor et al. .......... | 235/61.7 |
| 3,242,477 | 3/1966 | Frothingham .......... | 340/347 |
| 3,469,084 | 9/1969 | Garrett et al. .......... | 235/153 |
| 3,478,286 | 11/1969 | Dervan .......... | 235/153 |

*Primary Examiner*—Eugene G. Botz
*Assistant Examiner*—Charles E. Atkinson
*Attorneys*—J. H. Warden, Monte F. Mott and G. T. McCoy

ABSTRACT: A system in which a variable and measurable analog signal, such as a voltage, is supplied to an A/D converter, which is being analyzed. Successive digital outputs, such as numbers, of the converter are determined and temporarily stored for comparison purposes. Based on the relative values of the successive numbers, the input voltage to the converter is varied, both in polarity and in magnitude, until a voltage is reached, which when applied to the converter there exists a 50 percent probability that the output number is one of two adjacent numbers. The voltage magnitude, or simply the voltage, is recorded to represent one indecision zone. Thereafter, the input voltage is varied to determine another indecision zone between a selected output number and another number, different therefrom by one.

WILLIS W. ALLEN
*INVENTOR.*

BY J. H. Warden
G. ... Coy

ATTORNEYS

INVENTOR.
WILLIS W. ALLEN
BY J. H. Warden
Q. [signature]
ATTORNEYS

PATENTED SEP 7 1971 3,603,772

INVENTOR.
WILLIS W. ALLEN
BY J. H. Warden
[signature]
ATTORNEYS

INVENTOR.
WILLIS W. ALLEN

BY J. H. Warden
G. Lane Cory
ATTORNEYS

ANALOG-TO-DIGITAL CONVERTER ANALYZING SYSTEM

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The present invention generally relates to a signal conversion analysis system and, more particularly, to a system for analyzing analog-to-digital converters.

2. Description of the Prior Art

An analog-to-digital (A/D) converter is a device which converts an analog input signal, such as a voltage, into a related digital signal, typically a multidigit or multibit number. Since nearly all such devices do not have linear conversion characteristics, if accurate conversion data is required, it is necessary to plot the analog-to-digital conversion characteristics, a task which can only be accomplished with a high degree of accuracy by determining the device's indecision zones. As used herein, an indecision zone represents a magnitude of an analog input signal or voltage, which when applied to an A/D converter, a 50 percent probability exists that any one of two successive digital outputs or numbers may be produced. Only when all the indecision zones are known can the nonlinear analog-to-digital conversion characteristics be plotted accurately.

Herebefore, the values of the indecision zones could only be obtained by an operator who continuously varies the analog input voltage by very small increments. The input voltage is supplied to the A/D converter from a very accurate source. The operator records each voltage value which when applied to the converter may result in either of two digital outputs. Such an operation is expensive, since it is very time consuming. Also, it is subject to human error since it is mentally very fatiguing. Thus, a need exists for a system which is automatically operable to analyze A/D converters and one which automatically and accurately determines and records the analog-to-digital converter's indecision zones, from which a very accurate plot of the A/D converter's conversion characteristics may be obtained.

OBJECTS AND SUMMARY OF THE INVENTION

It is a primary object of the present invention to provide a system for automatically analyzing an analog-to-digital converter.

Another object of the invention is to provide a system for automatically providing measurable analog input signals each one of which represents an analog input signal in response to which an analog-to-digital converter may provide, with equal probability, either of two digital output signals.

A further object of the present invention is to provide a highly reliable and flexible system for automatically deriving, for analog-to-digital converters of different analog input ranges and different digital output ranges, selected indecision zones.

These and other objects other objects of the invention are achieved by providing a system in which a variable and measurable analog signal, such as a voltage, is produced for supply to an A/D converter which is being analyzed. Successive digital outputs, such as numbers, of the converter are determined and temporarily stored for comparison purposes. Based on the relative values of the successive numbers, the input voltage is varied both in polarity and in magnitude until a voltage is reached, which when applied to the converter there exists a 50 percent probability that the output number is one of two adjacent numbers. The voltage magnitude, or simply the voltage, is recorded to represent one indecision zone. Thereafter, the input voltage is varied to determine another indecision zone between a selected output number and another number, different therefrom by one.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
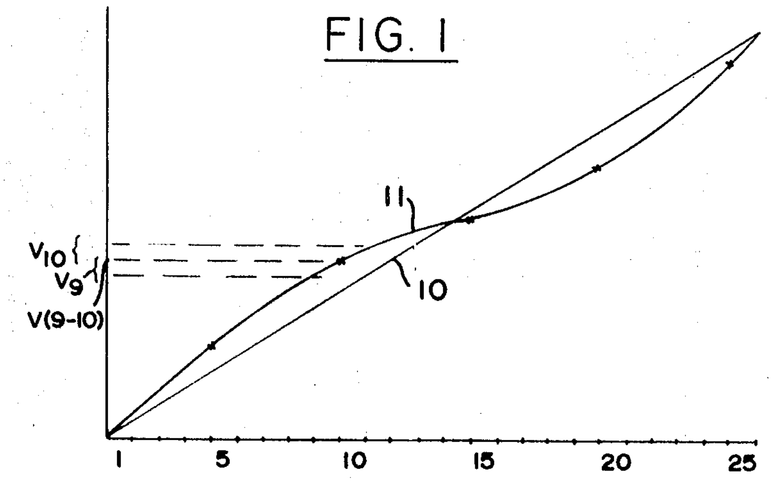
FIG. 1 is a simplified diagram useful in explaining the need for the present system.

Before proceeding to describe the present invention, reference is first made to the graph of FIG. 1, wherein theoretically, linear conversion characteristics of an A/D converter are represented by a straight line 10, while line 11 represents more realistic nonlinear conversion characteristics. In FIG. 1 the abscissa is used to designate the digital output of the converter in the form of numbers, while the ordinate is used to designate analog input voltage. As is appreciated by those familiar with the art, an A/D converter produces a given digital output such as a number 10, as long as the input voltage is within a given voltage range, such as V10. Likewise, the output is a number 9 as long as the input is within a range V9. In order, however, to plot a curve such as that represented by line 11, with any meaningful degree of accuracy, it is not sufficient to merely record a given number of different input voltages which produce different output numbers. Rather, it is necessary to determine a sufficient number of indecision zones, each one of which represents a voltage magnitude, which when applied to the analog-to-digital converter, the output may be either of two adjacent numbers with equal probability.

In FIG. 1, one such magnitude is designated V(9–10), representing the indecision zone between voltage range V9 and V10. When V(9–10) is applied, there exists an equal probability that the output number will be a 9 or a 10. Clearly, the accuracy with which the line 11 can be plotted increases with the number of indecision zones which are determined. It is towards automatically determining the indecision zones of an A/D converter that the present invention is directed.

Figure 2:
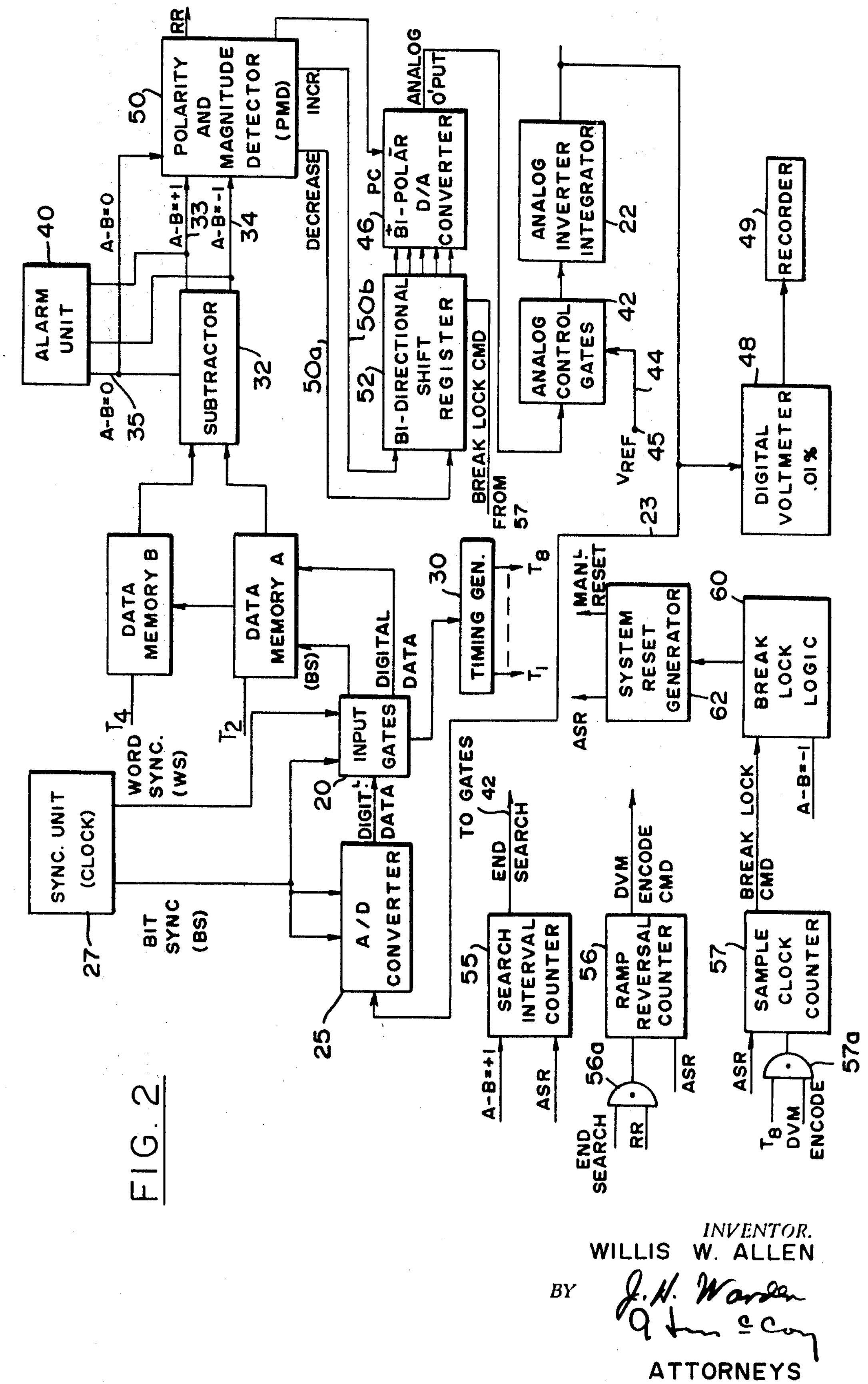
FIG. 2 is a detailed block diagram of the novel system of the present invention.
Figure 3:
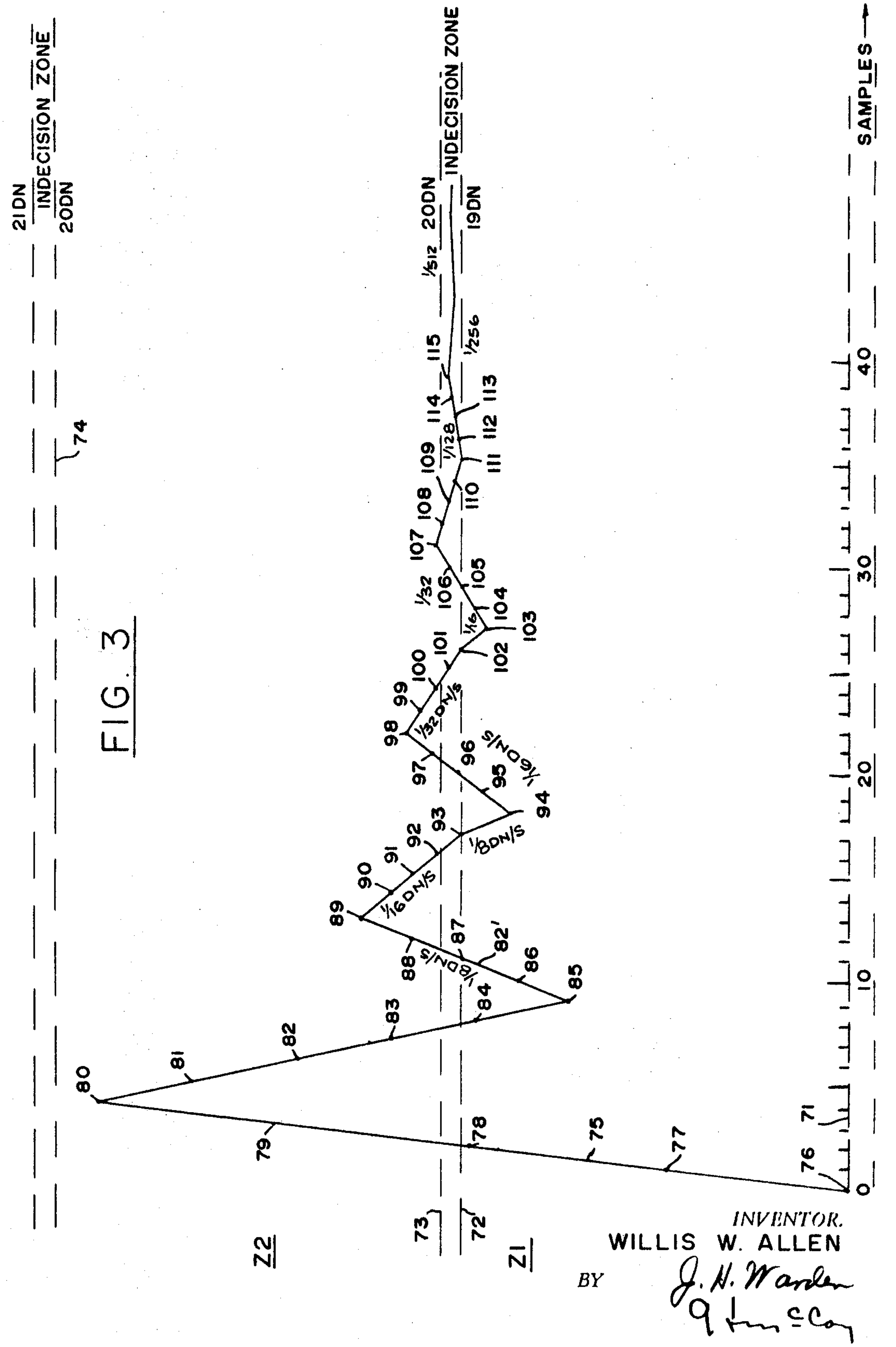
FIG. 3 is a diagram useful in explaining the mode of operation of the present invention.

Reference is now made to FIG. 2, in which the system of the present invention is diagrammed in block form. FIG. 3 is a simplified diagram of input voltage versus time, which is useful in explaining the mode of operation of the system, shown in FIG. 2, in order to automatically derive one of the indecision zones. The system of the present invention includes an input unit, comprising input gates 20 (see FIG. 2), and an output unit, comprising an analog inverter integrator 22. The integrator 22 is of the inverter type, so that when an input signal of a negative polarity is applied thereto, the integrator's output increases. An input signal of a positive polarity results in a decrease in the output of the integrator. The output of the integrator 22 is supplied, via a line 23, to the input of an A/D converter 25, whose digital output data is in turn supplied to the input gates 20. It is the indecision zones of converter 25 that the system of the present invention derives, automatically. A sync unit or clock 27 is connected to converter 25 to control the conversion operation therein, as well as to control input gates 20.

As is appreciated by those familiar with the art, an A/D converter, designed to provide digital output data as a function of an input signal, such as a voltage, is controlled by clocking signals, which in essence control the conversion operation therein. An analog-to-digital converter which produces a multibit output, provided therefrom in series over a single output line, as is assumed for converter 25, is generally provided with a sequence of bit sync (BS) signals. Each one of the BS signals actuates the converter to provide a different one of the output bits therefrom. A word sync (WS) signal is also supplied thereto to indicate the end of the conversion operation. As diagrammed in FIG. 2, it is the function of sync unit signals 27 to provide the sync signals to the converter 25 to cause the latter to operate in a manner well known in the art, as well as to supply the two types of sync signals to the input gates 20.

The function of gates 20 is to serve as direct current DC isolating circuits and break any ground loops, as well as to serve as a controlling path for the digital data or bits from converter 25. These bits are serially read into a data memory A, at a rate controlled by the bit sync signals supplied to the gates 20 from unit 27. Thus, the bits, which are serially read out from converter 25 are serially read in and temporarily stored in data memory A at the bit rate. Gates 20 further serve to provide a path for the word sync signal from unit 27 to a timing generator 30.

Briefly, the function of the latter is to provide a plurality of clock pulses or control signals, such as $T_1$–$T_8$, which are used in the various circuits of the system to control the operation therein to occur at a sequence, as will become apparent from the following description. For explanatory purposes, let it be assumed that converter 25 is responsive to an analog input voltage of 0–3 volts to provide 7-bit output numbers in the range of 0 to 127.

As seen from FIG. 2, in addition to data memory A, the system further includes a data memory B which is connected to data memory A. The function of memory B, which is activated by a $T_4$, pulse, is to store, whenever properly activated, the number presently stored in memory A. In accordance with the teachings of the present invention, the maximum rate of change of the voltage from integrator 22, which is supplied to A/D converter 25, is controlled to be a function of the word rate, the delay between conversion and detection, and the word sync signal rate, so that from one number readout, or sampling operation to the next, the output number does not change by more than one. Consequently, the difference between the numbers, stored in memories A and B, can never exceed one. Preferably, the maximum change in the voltage from the integrator 22 from one sampling to the next is related to one-half digital number (DN). In a converter of 0–3 volts input and 0–127 output each DN equals 23.4 mv. Thus, one-half DN corresponds to approximately 11.7 mv. In the following description it will be assumed that the maximum voltage change of the integrator's output is not more than 11.7 mv. per sampling, or sample period.

As seen in FIG. 2, the system of the present invention further includes a subtractor 32 to which the numbers, stored in both memories A and B, are supplied. The function of subtractor 32, which has three output lines designated 33, 34 and 35, is to subtract the number in memory B from that in memory A and provide a true output on one of its three output lines, depending on whether $A-B=1$, $A-B=-1$ or $A-B=0$. To insure that the system operates properly, i.e., that from one readout or sampling operation to the next the number change from the converter 25 is not greater than one, the three output lines of subtractor 32 may be supplied and connected to an alarm unit 40, whose function is to provide an alarm signal, whenever none of the three output lines of subtractor 32 is true.

As seen from FIG. 2, while the output of integrator 22 is supplied as a voltage to converter 25, its input is connected to the output of analog control gates 42 which are connected by means of a line 44 to a terminal 45, assumed to be connected to a voltage or potential, generally designated $V_{REF}$. The gates 42 are also connected to the output of a bipolar digital-to-analog (D/A) converter 46. The function of the analog control gates 42 is to control which of the two inputs thereof is supplied to the integrator 22.

Briefly stated, when a particular indecision zone of the converter is to be determined, the $V_{REF}$ potential at terminal 45 is used to charge the integrator 22 until the output voltage thereof, when supplied to the analog-to-digital converter 25 results in an output number which is one of the two numbers between which the indecision zone is located. Once this number is reached, the integrator 22 is disconnected from the $V_{REF}$ potential and the output of the bipolar D/A converter 46 is supplied thereto. Both the polarity and the magnitude of the output voltage of converter 46 are varied, as will be explained hereafter in detail, until the voltage output of integrator 22 is of a magnitude, which when applied to the A/D converter 25, there is a 50 percent probability that either of two output numbers will be produced thereby. The output voltage of integrator 22 is measured by a very accurate digital voltmeter 48, whose output is recorded by a recorder 49.

In addition to the aforementioned circuit, the system of the present invention, as shown in FIG. 2, includes a polarity and magnitude control logic 50, which for simplicity will hereafter be referred to as the polarity and magnitude detector or PMD. The three output lines of subtractor 32 are connected to the PMD. The logic circuitry, included in said detector will hereafter be described in great detail. However, for the time being, it is sufficient to point out that the PMD responds to the outputs of the subtractor 32 and supplies signals to a bidirectional shift register 52 whose output represents the digital input to the D/A converter 46.

The PMD 50 also supplies a polarity control (PC) signal to the D/A converter 46 to control the polarity of its analog output voltage which is supplied to the integrator 22 through the analog gates 42. Thus, the PMD 50, the register 52 and the D/A converter 46, serve as a unit, which controls the magnitude and the polarity of the voltage, which is applied to the integrator 22, and thereby controls the analog signal which is supplied to the A/D converter 25 under analysis.

The system, so far described, may best be explained in conjunction with FIG. 3, wherein the various numbers along the abscissa represent sampling periods, or samples, successively taken by the system. The ordinate represents analog output voltage of integrator 22 or analog input voltage to the A/D converter 25 under analysis. The graph may also be thought of as being divided into several zones. One zone, Z1, between dashed lines 71 and 72 is assumed to include input voltages to the A/D converter which result in a digital output number 19, while the zone Z2 between lines 73 and 74 includes input voltages to the A/D converter which result in a digital output of the number 20. The zone between lines 72 and 73 represents an indecision zone so that when an input voltage in said zone is applied to the A/D converter under analysis, there is a 50 percent probability that the output number will either be the number 19 or the number 20. FIG. 3 is used to explain the mode of operation of the system to determine the indecision zone between the numbers 19 and 20.

For explanatory purposes let it be assumed that the system is operated in the Search mode in which the $V_{REF}$ potential is applied to the integrator 22 through analog gates 42, causing the output of the integrator to rise at a rate of approximately but not more than one-half DN/sample, as represented by line 75. Let it be assumed that during sample 0 the input voltage to the A/D converter is as represented by dot 76 and let it further be assumed that the A/D converter has one sample delay built therein. That is, a full sample period elapses for the A/D converter to produce a digital number corresponding to its input voltage. Since the voltage at point 76 is in the zone Z1, at sample 1, the A/D converter produces an output number corresponding to the number 19 which is stored in the data memory A which is activated by $T_2$. The content of the latter is stored in data memory B which is activated by $T_4$. Similarly, the input voltage at sample 1, represented by dot 77 which is in zone Z1 activates the A/D converter so that at sample 2 the A/D supplies the number 19 to data memory A. However, since the same number 19 is stored in data memory B at sample 2, the subtractor 32 provides a true output on its $A-B=0$ output line 35.

At sample 2, the input voltage to the A/D converter represented by dot 78 in zone Z1 is used by the A/D converter so that at sample 3 the number 19 is again stored in memory A. At sample period 3, however, the input voltage to the integrator, represented by the dot 79, is in zone Z2. Consequently, at sample period 4 the A/D converter provides the number 20 to memory A. However, since memory B stores the number 19, the subtractor 32 provides a true output on its $A-B=+1$ output line at sample 4.

In accordance with the teachings of the present invention, the counter 55 is controlled to count $A-B=+1$ outputs of the subtractor 32 in the Search mode of operation. When the count in counter 55 reaches a selected value which is a function of the number of indecision zones of the A/D converter 25 under test, which are to be determined, an End-Search signal is provided by the counter 55 to indicate that the upper number of an indecision zone has been reached and thereby control the system to switch to determine the value of the indecision zone. For example, assuming that the counter 55 is set to determine the indecision zones between numbers 9 and 10, 19 and 20, 29 and 30, etc., i.e., every tenth indecision zone, the counter 55 is set to provide the End-Search signal after counting *10* $A-B=+1$ true outputs of subtractor 32.

Assuming that at sample 4 when the $A-B=+1$ output of the subtractor 32 is true the count in counter 55 is 10, a true End-Search signal is supplied by the counter 55 to the analog gates 42. As a result, the $V_{REF}$ potential is disconnected from the input of the integrator 22 and the output of the D/A converter 46 is supplied thereto. The initial polarity of the voltage from the D/A converter 46 is supplied thereto. The initial polarity of the voltage from the D/A converter 46 is opposite that of the $V_{REF}$ potential, causing the output of the integrator 22 to decrease. The maximum voltage from the D/A converter 46 is approximately half that of the $V_{REF}$ potential. Consequently, the rate of change of the output of integrator 22 is half the rate of change which is produced when the $V_{REF}$ potential is applied thereto. That is, the rate of change of the output voltage of integrator 22 due to the maximum voltage from the D/A converter 46 is approximately one-fourth DN/sample.

Before proceeding with the description of FIG. 3, the convergence algorithm will be explained. Briefly, after the Search operation, whenever $A-B=+1$ or whenever $A-B=-1$, i.e., whenever either line 33 or 34 is true, the PMD 50 reverses the polarity of the output voltage of the D/A converter 46 by supplying it with a PC signal. It also supplies a pulse on a line **50*a* to shift to bi-directional shift register 52 by one stage to decrease the output thereof, resulting in a decrease in the slope rate of the output of the integrator 22 by a power of 2. Thus, line 50*a* is labeled as the Decrease Line. Also, an $A-B=0$ memory section in the PMD 50 is reset. If four consecutive $A-B=0$ samples occur, the polarity remains the same. However, the PMD 50 provides a pulse on a line 50*b*, designated Increase, to shift the bidirectional shift register 52 to increment the output thereof and thereby increase the slope rate by a power of 2. Also, the $A-B=0$ memory in the PMD 50** is reset.

Based on the foregoing description, FIG. 3 may now be summarized in conjunction with the following chart.

Therein numbers 76–115 represent points on the graph of FIG. 3 which correspond to voltages applied to the A/D converter 25 at samples 0–39. Each voltage is assumed to be either in zone Z1 or Z2. The lower half of the indecision zone is assumed to be in Z1 and the upper half in Z2.

Let it be assumed that the $A-B=+1$ output of subtractor 32 at sample 4 is the 10th such output, counted by counter 55, and that as a result an End Search signal is supplied to gates 42. As a result, the maximum output of the D/A converter 46 is supplied to the integrator 22 through gates 42. This output is of a polarity opposite that of the $V_{REF}$ so that the actual output of the integrator decreases. The maximum output of converter 46 is half that of $V_{REF}$. Consequently, the maximum rate of change of the output of integrator 22 is one-fourth DN/sample. As seen from FIG. 3 and the Chart, at each of samples 5–8 the subtractor's output is $A-B=0$. Since at sample 8 the fourth successive $A-B=0$ is sensed, according to the algorithm the PMD 50 shifts register 52 to increase, i.e., double the input to D/A converter 46 and thereby double the voltage supplied to the integrator. This is indicated in the Chart by the entry INCREASE in the line of sample 8. However, since the D/A converter 46 already supplies the maximum output, it cannot be doubled. Consequently, the rate of change of the integrator's output remains unchanged.

Then at sample 9, the subtractor's output is $A-B=-1$. Consequently, the polarity is reversed, the shift register 52 is shifted so that its output is decreased, decreasing the output of D/A converter 46 by a factor of two, so that between samples 9 and 13 the rate of change is one-eighth DN/sample.

| Sample | Input to A/D converter 25 | | Digital output of A/D converter 25 | Output of subtractor 32 | Operation of PMD 50 | | Number stored in Memory B |
|---|---|---|---|---|---|---|---|
| | Point | Zone | | | Polarity | Magnitude | |
| 0 | 76 | Z1 | ------ | ------ | ------ | ------ | .. |
| 1 | 77 | Z1 | 19 | ------ | ------ | ------ | 19 |
| 2 | 78 | Z1 | 19 | A−B=0 | ------ | ------ | 19 |
| 3 | 79 | Z2 | 19 | A−B=0 | ------ | ------ | 19 |
| 4 | 80 | Z2 | 20 | A−B=+1 | REVERSE | DECREASE | 20 |
| 5 | 81 | Z2 | 20 | A−B=0 | | | 20 |
| 6 | 82 | Z2 | 20 | A−B=0 | | | 20 |
| 7 | 83 | Z2 | 20 | A−B=0 | | | 20 |
| 8 | 84 | Z1 | 20 | A−B=0 | | INCREASE | 20 |
| 9 | 85 | Z1 | 19 | A−B=−1 | REVERSE | DECREASE | 19 |
| 10 | 86 | Z1 | 19 | A−B=0 | | | 19 |
| 11 | 87 | Z1 | 19 | A−B=0 | | | 19 |
| 12 | 88 | Z2 | 19 | A−B=0 | | | 19 |
| 13 | 89 | Z2 | 20 | A−B=+1 | REVERSE | DECREASE | 20 |
| 14 | 90 | Z2 | 20 | A−B=0 | | | 20 |
| 15 | 91 | Z2 | 20 | A−B=0 | | | 20 |
| 16 | 92 | Z2 | 20 | A−B=0 | | | 20 |
| 17 | 93 | Z1 | 20 | A−B=0 | | INCREASE | 20 |
| 18 | 94 | Z1 | 19 | A−B=−1 | REVERSE | DECREASE | 19 |
| 19 | 95 | Z1 | 19 | A−B=0 | | | 19 |
| 20 | 96 | Z1 | 19 | A−B=0 | | | 19 |
| 21 | 97 | Z2 | 19 | A−B=0 | | | 19 |
| 22 | 98 | Z2 | 20 | A−B=1 | REVERSE | DECREASE | 20 |
| 23 | 99 | Z2 | 20 | A−B=0 | | | 20 |
| 24 | 100 | Z2 | 20 | A−B=0 | | | 20 |
| 25 | 101 | Z2 | 20 | A−B=0 | | | 20 |
| 26 | 102 | Z1 | 20 | A−B=0 | | INCREASE | 20 |
| 27 | 103 | Z1 | 19 | A−B=−1 | REVERSE | DECREASE | 20 |
| 28 | 104 | Z1 | 19 | A−B=0 | | | 19 |
| 29 | 105 | Z1 | 19 | A−B=0 | | | 19 |
| 30 | 106 | Z2 | 19 | A−B=0 | | | 19 |
| 31 | 107 | Z2 | 20 | A−B=+1 | REVERSE | DECREASE | 20 |
| 32 | 108 | Z2 | 20 | A−B=0 | | | 20 |
| 33 | 109 | Z2 | 20 | A−B=0 | | | 20 |
| 34 | 110 | Z1 | 20 | A−B=0 | | | 20 |
| 35 | 111 | Z1 | 19 | A−B=−1 | REVERSE | DECREASE | 19 |
| 36 | 112 | Z1 | 19 | A−B=0 | | | 19 |
| 37 | 113 | Z1 | 19 | A−B=0 | | | 19 |
| 38 | 114 | Z2 | 19 | A−B=0 | | | 19 |
| 39 | 115 | Z2 | 20 | A−B=+1 | REVERSE | DECREASE | 20 |

At sample 13, the output of subtractor 32 is again $A-B=+1$. Consequently, the output of the D/A converter 46 is decreased (by a factor of two) and its polarity reversed by the PC signal supplied thereto from PMD 50. Between samples 13 and 17 the rate of change is one-sixteenth DN/sample. At sample 17 the fourth consecutive $A-B=0$ is sensed. Consequently, the output of converter 46 is increased (by a factor of two) so that the rate of change is increased to one-eighth DN/sample. Then, at sample 18, $A-B=-1$, causing the PMD 50 to decrease the output of converter 46 through the shift register 52 by a factor of two and reversing the voltage polarity so that the rate of change is one-sixteenth DN/sample and the input voltage to A/D converter 25 increases.

At each of samples22, 27 and 31, the output of subtractor 32 is $A-B=+1$, $A-B=-1$ and $A-B=+1$, respectively. Thus, at each, the magnitude of the output of the D/A converter 46 is decreased by a factor of two and its polarity is reversed from its previous polarity.

From the foregoing it should thus be appreciated that by such a technique, the output voltage of the integrator converges to a point or value in the indecision zone, so that after a sufficient number of ramp reversals occur, the actual integrator's output voltage is one which causes the A/D converter 25 under examination, to provide either the number 19 or the number 20 with equal probability.

As seen from FIG. 2, in accordance with the teachings of the present invention, whenever a ramp reversal is sensed by the PMD 50, a true ramp reversal (RR) output is provided which is supplied to gate 56*a*, which represents the input gate of counter 56. The counter actually counts the number of the ramp reversals. When a preselected number of such reversals is counted, depending on the accuracy with which the indecision zone is to be determined, counter 56 provides a DVM Encode command output which is supplied to the digital voltmeter 48. The function of this signal is to activate the voltmeter to measure and record the voltage on line 23, which represents the input voltage to the A/D converter 25, under analysis.

The DVM Encode command (CMD) signal is also supplied to gate 57*a* which is enabled during clock pulse $T_8$ to activate counter 57. As previously pointed out, this counter acts as a clock to measure a preselected time period following the DMV Encode command signal. Time is chosen to be sufficient to enable the voltmeter 48 to properly measure the voltage on line 23 and record it by recorder 49.

At the end of this period, counter 57 provides a break lock command signal to break lock logic 60. The function of logic 60 is to detect the first time that the output of subtractor 32 is $A-B=-1$ after the break lock command signal is supplied thereto. When this condition occurs, the break lock logic 60 activates the system reset generator 62 to provide an automatic system reset signal (ASR) to the various circuits of the system. Also, the break lock logic 60 switches the analog control gates 42 to again supply the $V_{REF}$ potential to the integrator 22, which is necessary to again increase the input voltage to the A/D converter under analysis, to reach a second indecision zone. In the particular example, described herein, the second indecision zone will be reached when ten successive $A-B=+1$ outputs will be sensed by the counter 55, since in the present example it is assumed that the system is operable to determine every tenth indecision zone of the A/D converter under analysis.

From the foregoing description, it should thus be apparent that the system of the present invention includes all the circuitry necessary to automatically determine indecision zones of an A/D converter. It should further be appreciated, that the various circuits, hereinbefore referred to, are presently well known in the art, or are of the type which in light of the foregoing description are easily implementable by anyone familiar with logic design. For example, data memories A and B, bidirectional shift register 52, bipolar D/A converter 46, counters 55, 56 and 57, sync unit 27 and timing generator 30 are all conventional well-known circuits.

From the foregoing description, it should be apparent that subtractor 32 may be embodied in any one of several different arrangements in order to provide a true output on one of its three output lines 33 through 35, depending on the comparison be between the two numbers in the two data memories A and B. It should further be appreciated that, based on the aforedetailed algorithm of the PMD 50, the PMD may be implemented by conventional logic design techniques by one familiar with logic design. However, in order to further highlight the invention, one specific embodiment of the PMD 50 is diagrammed in FIG. 4, to which reference is now made.

Figure 4:
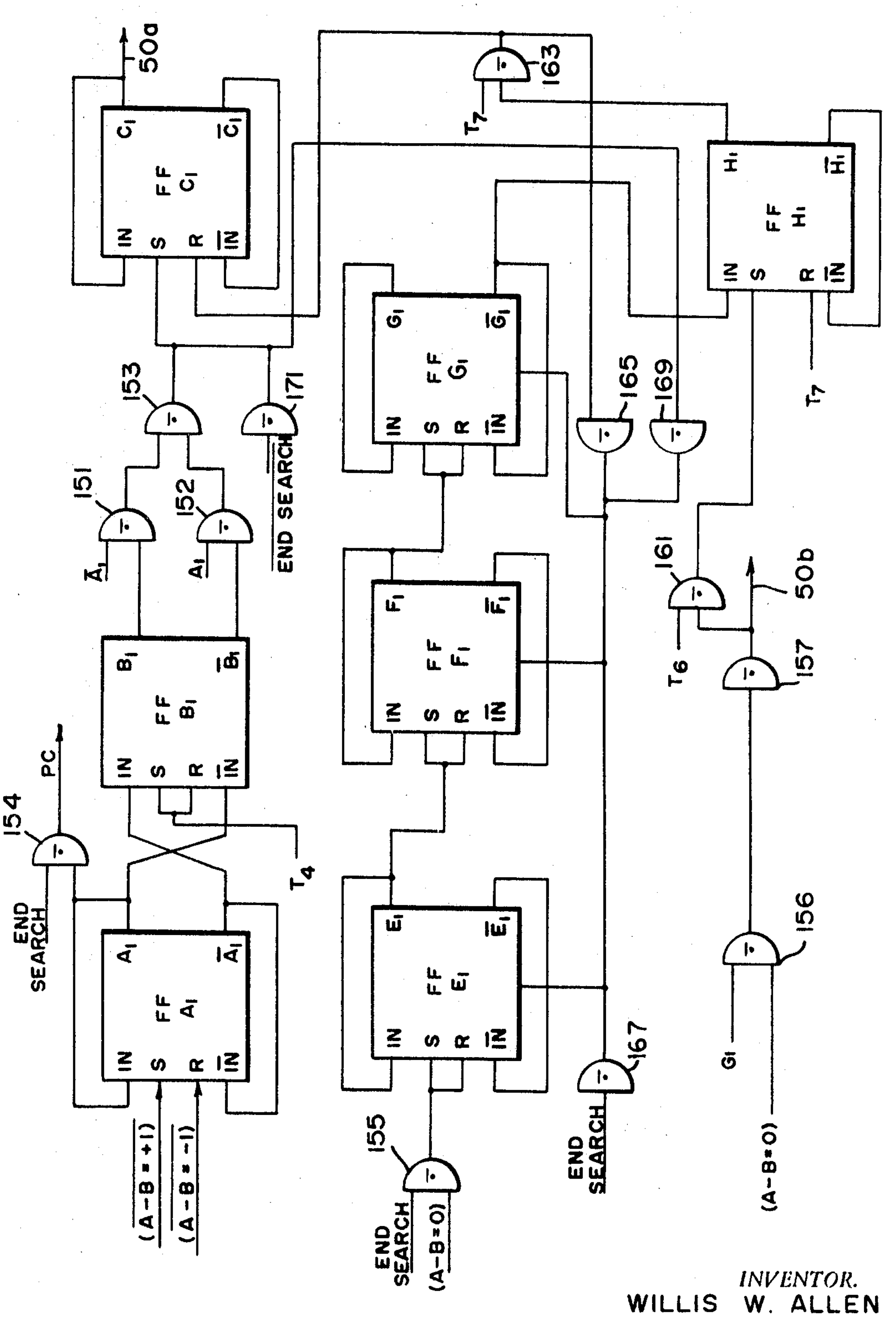

In FIG. 4, seven flip-flops, $A_1$–$C_1$ and $E_1$–$H_1$, are shown together with a plurality of NAND gates, each designated by a symbol, $\bar{\cdot}$ where the dot (·) designates the AND function and the bar (–) the NO function. Flip-flop $A_1$ and $B_1$ are used to temporarily store the output of subtractor 32. Basically, flip-flop $A_1$ stores the present subtractor output, while flip-flop $B_1$ stores the previous subtractor output. Flip-flop $A_1$ is true when the present data sample is $A-B=+1$ or $A-B=0$, while flip-flop $A_1$ is false when the present data sample is $A-B=0$ or $A-B=-1$. The outputs of flip-flops $A_1$ and $B_1$ are compared by a half adder, comprising of NAND gates 151, 152 and 153. Whenever the states of the two flip-flops $A_1$ and $B_1$ are different from one another, i.e., one flip-flop is true and the other is false, indicating a change in the output of subtractor 32 other than 0, flip-flop $C_1$ is driven to its true state from $T_4$ to $T_8$, indicating that a polarity reversal has occurred. The output of flip-flop $C_1$ is connnected to line 50*a* which, as previously explained, is connected to register 52 to decrease by a power of two the content of the bidirectional shift register 52, and thereby decrease by a factor of two the voltage which is eventually supplied to the integrator 22.

As seen from FIG. 4, the output of flip-flop $A_1$ is supplied to one input of a NAND gate 154, the other input of which represents the End Search signal from the counter 55. Thus, whenever the flip-flop $A_1$ changes state, a polarity control (PC) signal is supplied to the D/A converter 46 to reverse the polarity therein.

Flip-flops $E_1$, $F_1$ and $G_1$ form a divide-by-eight counter, which counts the number of $A-B=0$ outputs from the subtractor 32 which are supplied to flip-flop $E_1$ through a NAND gate 155. In the one sample delay mode, hereinbefore assumed, if four consecutive $A-B=0$ outputs of the subtractor are detected and counted by the three flip-flops ($E_1$, $F_1$ and $G_1$), flip-flop $G_1$ becomes true from $T_2$ to $T_7$. When flip-flop $G_1$ is true, a NAND gate 156 is activated, whose output is connected, through another NAND gate 157, to the PMD 50 output line 50*b*. As herebefore explained, a signal on line 50*b* increases the count in the register 52 by a factor of two, which results in the doubling of the voltage which is supplied to the integrator 22.

Also, the output of NAND gate 157 is supplied to a NAND gate 161 which is triggered during $T_6$ so as to set a flip-flop $H_1$. The output of the latter is supplied to one input of a NAND gate 163, whose other input is triggered during $T_7$. The output of NAND gate 163 is used to reset the three flip-flops $E_1$, $F_1$ and $G_1$, through a NAND gate 165. Thus, after four consecutive $A-B=0$ outputs of the subtractor 32 are detected, the voltage which is supplied to the integrator 22 is increased by a factor of two, by doubling the count in register 52 and the three flip-flops $E_1$, $F_1$ and $G_1$ are reset.

The three flip-flops are also reset at the End of Search by the output of a NAND gate 167, as well as whenever a polarity reversal is detected, which is indicated by the output of NAND gate 153 of the half adder. The resetting of the three flip-flops, when a polarity reversal is detected, is achieved by utilizing the output of a NAND gate 169, whose input is connected to the output of NAND gate 153. Also, the three flip-flops are reset whenever an $\overline{\text{End of Search}}$ signal is supplied to a NAND gate 171. This occurs when the system, after recording one indecision zone moves toward locating the next indecision zone to be measured.

From the foregoing it should thus be appreciated, that the logic circuitry, shown in FIG. 4, senses the polarity reversal by means of flip-flops $A_1$, $B_1$ and $C_1$, causing a decrease by a factor of two in the count which is stored in register 52. The output of $A_1$ is used to provide a polarity control (PC) signal to the converter 46. Also, the circuitry includes three flip-flops ($E_1$, $F_1$ and $G_1$) which together with the aforementioned gates are used to sense four consecutives $A-B=0$ outputs of the subtractor 32. When such four successive or consecutive signals are sensed, the count in the bidirectional shift register 52 is doubled to double the voltage which is supplied to the integrator 22. The circuitry is also used in such a way that the three flip-flops, representing the $A-B=0$ counter, are reset whenever a polarity reversal is sensed or after four consecutives $A-B=0$ signals are sensed.

Figure 5:
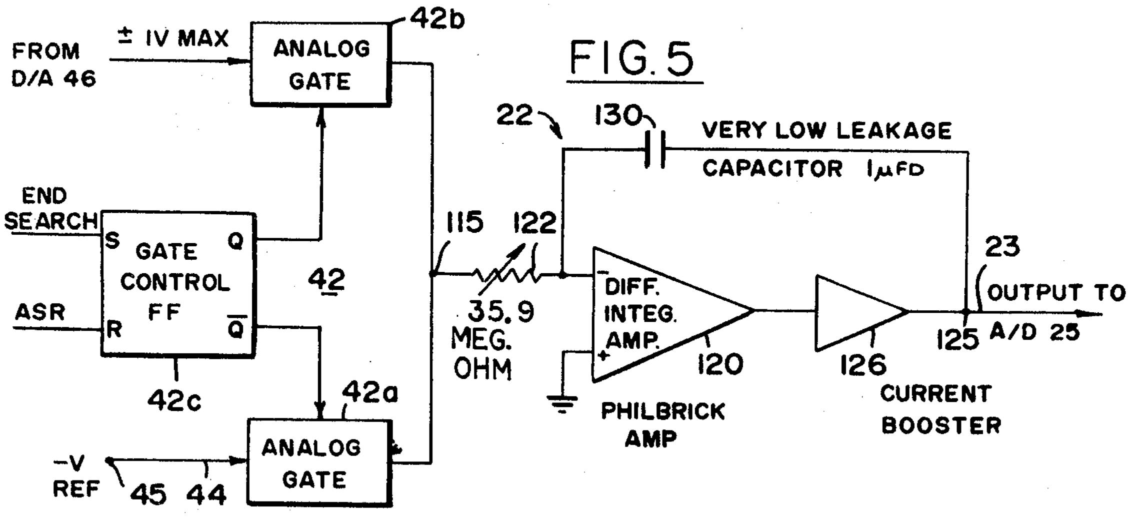
FIG. 4, 5 and 6 are diagrams detailing certain parts of the system, shown in FIG. 2.

Reference is now made to FIG. 5, which is a combination block and schematic diagram of the analog inverter 22 and the analog control gates 42. Therein, 42*a*, and 42*b* designate two analog input gates, with their outputs connected to an input terminal 115 of integrator 22. The input of gate 42*a* is connected to $V_{REF}$, through line 44, while that of gate 42*b* is connected to the analog output of D/A converter 46. Briefly, when the system is in the search mode, a gate control FF 42*c* is assumed to be in a reset state so that $\overline{Q}$ is true, enabling gate 42*a* to apply the $V_{REF}$ potential to input terminal 115 of integrator 22. Then, when a true End-Search signal is supplied by counter 55 (see FIG. 2), FF 42*c* is set. As a result, gate 42*a* is closed and gate 42*b* is enabled. Consequently, the output of D/A converter 46 is supplied to the integrator.

As shown in FIG. 5, the integrator includes a difference integrating amplifier 120 connected through a variable resistor 122 to input terminal 115. When operating as an inverting integrator, the negative (−) terminal of the amplifier is connected to the resistor 122, while the positive (+) terminal is connected to a reference potential, such as ground. The output of amplifier 120 is connected to an output terminal 125, preferably through a current booster 126. A capacitor 130 which controls the time constant of the integrator is connected across the amplifier 120 and current booster 126. It is important that the capacitor have very low leakage characteristics. In one particular application, actually reduced to practice, the amplifier 120 and current booster 126 comprise amplifiers of the types P2 and P5 sold by Philbrick Corporation of Dedham, Mass. The values of the resistor 122 and capacitor 130, which are shown in FIG. 5, are for the specific embodiment which was actually reduced to practice. With a sample rate of 4.761 samples per second and a search rate one-half DN/per sample, the ramp rate was chosen to be 55.704 mv./sec.

From the foregoing it should thus be appreciated that the system herebefore described is capable of automatically determining and recording an indecision zone of a A/D converter. Once one indecision zone such as between 19 and 20 is recorded, another indecision zone may be determined by increasing the input to the A/D converter under analysis until its digital output is one of the two numbers of the indecision zone. In the present example, it is the higher of the two numbers. Assuming that the system is set to record every tenth zone it is necessary to raise the voltage to the A/D converter until its digital output is the number 30. This is done by controlling counter 55 to count 10 $A-B=-1$ signals. However, for the system to operate properly it is necessary to insure that the counting starts from a known reference point with respect to the last measured indecision zone. For the foregoing example it is necessary to insure that the output of the A/D converter is a DN of 19 before the system is reset by generator 62 so that the 10th count of counter 55 occurs when the output of the A/D converter is a DN of 30. Otherwise improper indecision zones may be recorded.

To insure that the system is reset at the proper time, it incorporates the break lock logic 60. The latter circuit responds to the break lock command signal from counter 57 which indicates that the last indecision zone was recorded. Then it forces the D/A converter 46 to supply a maximum output of a positive polarity so that the output of the integrator 22 decreases at a maximum rate, such as is designated by numeral 83 in FIG. 3. Then when the first $A-B=-1$ is sensed the output of the A/D converter is definitely the lower number, i.e., 19 across the last recorded indecision zone. Thus, the logic 60 supplies generator 62 with an activating signal.

In response thereto the generator resets the various circuits by supplying the ASR (Automatic System Reset) signal thereto. When counter 55 is reset, its output is false. Consequently, gates 42 supply integrator 22 with the $V_{REF}$ potential. Consequently, the voltage to the integrator 22 increases and therefore the digital output of the A/D converter 25 increases. When 10 $A-B=+1$ samples are counted, i.e., when the digital output is 30, the End of Search signal is provided by counter 55 to gates 42 and the system automatically determines the indecision zone between numbers 29 and 30.

Figure 6:
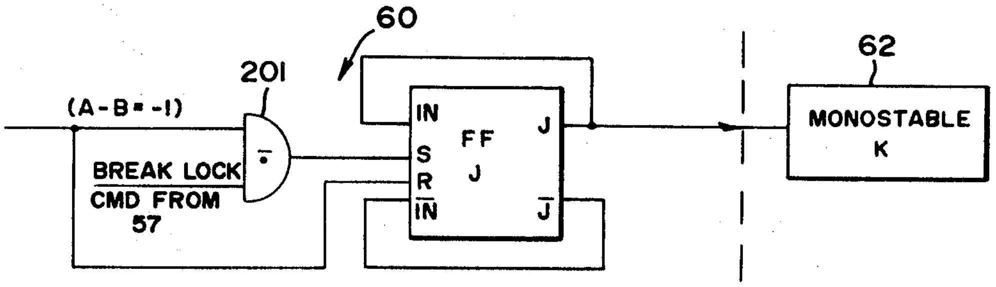

Reference is made to FIG. 6 which is a simple diagram of one embodiment of the break lock logic 60. Basically, the break lock logic 60 comprises a NAND gate 201 and a flip-flop, J. The flip-flop J is set to a true state, also referred to as a one, when the break lock command, from counter 57 (see FIG. 2), and the first $A-B=-1$ are true. The former is true after an indecision zone has been recorded, by recorder 49. When flip-flop J is true a monostable multivibrator K, which represents the system reset generator 62 (FIG. 2), is enabled. Then, when J is reset by an $A-B=+1$ signal, generator 62 is triggered, producing a very narrow pulse which represents the automatic system reset (ASR) pulse or signal.

The sequence of events, in connection with the break lock logic, may be summarized as follows. AFter an indecision zone is recorded, the break lock command (CMD) is produced by counter 57. The CMD resets the bi-directional shift register 52, causing the integrator 22 to have a maximum slope of one-fourth DN per sample. When the subtractor detects the next $A-B=-1$, flip-flop J (FIG. 6) is set to a logic 1. Then, when the next $A-B=+1$ is sensed flip-flop J is reset, triggering system reset generator 62 to reset automatically the various counters and other circuits of the system.

From the foregoing description it should be appreciated that in accordance with the teachings of this invention a system is provided which automatically records indecision zones of an A/D converter. This is accomplished by automatically varying the analog input to the A/D converter until a selected number of ramp reversals are sensed. A ramp reversal (RR) is represented by a change in the polarity of the difference between two successive digital outputs of the A/D converter, herebefore referred to as $A-B=+1$ and $A-B=-1$. After an indecision zone is recorded, the system automatically increases the analog input to the A/D converter until the next indecision zone is reached.

Although the invention has been described in connection with an example in which each 10th indecision zone is measured, clearly, by setting counter 55 to count other than 10 $A-B=+1$ inputs, more or less than every 10th zone may be measured. Also, the invention has been described in connection with an example in which zones from lower to higher values are measured. Clearly, by reversing the voltage polarities, the order of measuring the zones may be reversed from the zone with the highest value to the zone with the lowest value.

Although particular embodiments of the invention have been described and illustrated herein, it is recognized that modifications and variations may readily occur to those skilled in the art and consequently it is intended that the claims be interpreted to cover such modifications and equivalents.

1. A system for automatically analyzing an analog-to-digital converter to determine at least one magnitude of an analog input signal which when applied to said converter an equal probability exists that the digital output of said converter is either a first number or a second number, the system comprising:

analog integrating means for supplying an analog input signal to said converter;

means for sampling the digital output of said converter to provide output numbers at a fixed rate;

means coupled to the output of said means for sampling for storing each number and for comparing it with a number previously supplied therefrom;

means for applying an analog signal to said analog integrating means to apply a changing analog input signal to said converter so that said first and second numbers are successively provided thereby; and control means coupled to said means for storing and to the input of said means for applying an analog signal to said analog integrating means for utilizing the numbers stored in said means for storing to successively control the polarity and amplitude of an analog signal applied thereby to said analog integrating means, until said analog integrating means supplies said converter with an analog input signal having a magnitude whereby an equal probability exists that the output number of said converter is either said first number or said second number.

2. A system for determining an indecision zone of an analog-to-digital converter, the indecision zone being defined as an analog input having an amplitude which when applied to said converter the output of said converter is either of two digital numbers producible with equal probability, the system comprising:

analog integrating means responsive to an input signal for applying an analog input to said analog-to-digital converter;

control means including means for storing the digital output of said converter and for providing control signals as a function of the magnitude relationship between successive digital outputs of said converter;

means for sensing said control signals to provide the input signal to said integrating means as a function of said control signals; and recording means coupled to said control means and to said analog integrating means for recording the analog input to said analog-to-digital converter after the occurrence of a preselected number of selected ones of said control signals.

3. The arrangement as recited in claim 2 wherein said control signals include a first and second control signal indicating that a present digital output of said converter is greater by one and smaller by one respectively, from a previous digital output and means for recording include means for counting said first and second control signals to record said analog input after the occurrence of a selected number of said first and second control signals.

4. The arrangement as recited in claim 3 wherein said means for sensing include bipolar input signal producing means for reversing the magnitude and polarity of said input signal to said integrating means when said control signal is either a first or a second control signal.

5. The arrangement as recited in claim 4 wherein said control means include means for providing a third control signal when two successive digital outputs of said converter are the same, and said sensing means include means for controlling the amplitude of said input signal to said integrating means as a function of a predetermined number of successive third control signals.

6. The arrangement as recited in claim 2 wherein the storing means of said control means include a first unit for storing an output digital number of said converter and a second unit storing a previous output digital number of said converter, and said control means include subtracting means for providing a first control signal when the number in said first unit is greater by one than the number in said second unit, a second control signal when the number in said first unit is smaller by one than the number in said second unit and a third control signal when the two numbers are equal, and said sensing means include means for decreasing the amplitude and reversing the polarity of the input signal to said integrating means in response to either a first control signal or a second control signal supplied thereto, said sensing means increase the amplitude of said input signal in response to a preselected number of successive third control signals supplied thereto.

7. The arrangement as recited in claim 6 wherein said sensing means include a detector for providing a ramp reversal signal and a decrementing signal whenever a first or a second control signal is supplied thereto, said detector providing an increment signal whenever said preselected number of successive third control signals is detected, said sensing means including a bidirectional shift register responsive to said decrement and increment signals for shifting a binary digit of a multibit number therein whereby to double the number in response to an increment signal and reduce the number by a factor of two in response to a decrement signal, and a bipolar digital-to-analog converter, for providing said input signal whose amplitude is a function of the number in said shift register and the polarity as a function of either said first or said second control signals.

8. A system for analyzing an analog-to-digital converter comprising:

first means for supplying a variable analog input to an analog-to-digital converter;

second means for storing successive digital outputs of said analog-to-digital converter;

third means for providing an output indicative of the difference between the digital outputs, stored in said second means;

fourth means, to which the output from said third means is supplied, for controlling said first means to control the analog input which is supplied by said first means to said analog-to-digital converter; and fifth means coupled to at least said first means for measuring said analog input.

9. The arrangement as recited in claim 8 wherein said analog-to-digital converter is characterized by a time $t$, where $t$ represents the time interval between successive digital outputs which are read out from said analog-to-digital converter and said first means is operable to provide a maximum change in said analog input which is not greater than ½V per $t$, where V represents a potential difference which results in a change of one in the digital output of said analog-to-digital converter.

10. The arrangement as recited in claim 8 wherein the output of said third means is indicative of a change of zero between the digital outputs stored in said second means, or a difference of +1, or a difference of −1.

11. The arrangement as recited in claim 10 further including means for coupling said third means to said fifth means whereby said fifth means measure said analog input after a preselected number of either +1 or −1 differences are indicated by said third means.

12. The arrangement as recited in claim 11 wherein said analog-to-digital converter is characterized by a time $t$, where $t$ represents the time interval between successive digital outputs which are read out from said analog-to-digital converter and said first means is operable to provide a maximum change in said analog input which is not greater than ½V per $t$, where V represents a potential difference which results in a change of one in the digital output of said analog-to-digital converter.

13. The arrangement as recited in claim 12 wherein said fourth means includes a bi-directional shift register and detecting means responsive to an output of said third means which indicates either a +1 difference or −1 difference for shifting said shift register in a first direction, and being further responsive to a selected number of outputs of said third means, all of which indicate a zero difference, for shifting said shift register in a second direction, opposite said first direction, said fourth means further including a digital-to-analog converter for providing an analog output having a magnitude which is a function of a count in said shift register.

14. The arrangement as recited in claim 13 wherein said digital-to-analog converter is a bipolar digital-to-analog converter, and said third means further include means for providing a pulse from said detecting means to said bipolar digital-to-analog converter to reverse the polarity of its analog output, whenever said detecting means sense that the output of said third means indicates either a +1 or a −1 difference between the digital numbers, stored in said second means.

15. The arrangement as recited in claim 14 wherein a shift in said shift register in said first direction results in a reduction in its content by a factor of 2, and a shift in said second direction results in an increase in its content by a factor of 2.

16. The method of automatically determining an indecision zone of an analog-to-digital converter, the indecision zone representing the amplitude of an analog input which when applied to the analog-to-digital converter, an equal probability exists that the digital output is one of two adjacent numbers, the steps comprising:

comparing two successive digital outputs of the analog-to-digital converter, and providing a comparison-indicating output which indicates the difference between the compared digital outputs;

utilizing the comparison-indicating output to vary the analog input to the analog-to-digital converter so that the comparison-indicating output represents either a difference of +X or a difference of −X between the two compared digital outputs, X being an integer; and measuring the analog input to said analog-to-digital converter after a selected number of comparison-indicating outputs indicate differences of either a +X or a −X.

17. The method as recited in claim 16 wherein X=1.